United States Patent

[11] 3,611,140

[72] Inventor Masatoshi Shimada
78 Todorokicho 2-chome, Tamagawa, Setagaya-ky, Tokyo-to, Japan

[21] Appl. No. 845,240
[22] Filed July 28, 1969
[45] Patented Oct. 5, 1971

[54] RADIO TRANSCEIVER WITH VARIABLE AUDIO AMPLIFICATION
10 Claims, 13 Drawing Figs.

[52] U.S. Cl. .......... 325/15, 179/1, 325/18, 325/182, 325/183
[51] Int. Cl. .......... H04b 1/44
[50] Field of Search .......... 179/1 SW, 1.4, 1 VL, 1 A, 6; 325/15, 16, 18, 21, 22, 31, 133, 111, 182, 187

[56] References Cited

UNITED STATES PATENTS

| | | | |
|---|---|---|---|
| 2,560,121 | 7/1951 | Mitchell | 325/21 X |
| 3,234,333 | 2/1966 | Guder | 179/6 |
| 3,500,458 | 3/1970 | Cannalte | 325/187 X |

*Primary Examiner*—Benedict V. Safourek
*Attorney*—Karl F. Ross

ABSTRACT: A radio transmitter, especially for vehicular two-way communication, has a fixed unit including an amplifier system and a detachable handset containing a microphone which can be rendered operative by pushing a press-to-talk button. A second, independent switch is operable to turn on the microphone with an increased gain of the amplifier system to enable message transmission without removal of the landset from its hook.

Masatoshi Shimada
INVENTOR.

BY

Karl F. Ross
Attorney

Masatoshi Shimada
INVENTOR.

BY

Karl F. Ross
Attorney

Masatoshi Shimada
INVENTOR.

BY

Karl F. Ross
Attorney

Masatoshi Shimada
INVENTOR.

BY

Karl F. Ross
Attorney

RADIO TRANSCEIVER WITH VARIABLE AUDIO AMPLIFICATION

My present invention relates to a radio transmitter of the type wherein a main unit, including modulating and amplifying stages, is conductively connected via a flexible cable or the like with an ancillary unit or handset comprising a microphone into which a user may speak in order to send out messages to a remote station. With the user seated at a certain distance from the main unit, e.g. at a desk or in a vehicle, he must reach out for the handset and detach it from the unit in order to talk into it.

Such transmitters are frequently employed in two-way radio communication systems, operating at citizen-band wavelengths, in which case the main unit also includes a receiving stage and a coupling circuit for alternatively connecting the receiving stage or the transmitting stage to a common antenna; a switchover relay, controlled by a manual actuator such as a press-to-talk button, is then employed for changing from a normal receiving position to an off-normal transmitting position, this button being usually mounted on the removable handset. Reference in this connection may also be made to my copending application Ser. No. 582,811, filed 29 Sept. 1966, now U.S. Pat. No. 3,513,397, issued 19 May 1970, disclosing a two-way communication system of this type.

In such a system, especially when the same is designed for use by the driver of a moving vehicle, difficulties may arise as the user not only must hold the microphone close to his mouth but at the same time must repeatedly operate his press-to-talk button in order to switch from transmission to reception and back again. The inconvenience of depressing the button with the hand holding the microphone restricts the use of the transmitter when the operator has only one hand free.

It is, therefore, the general object of my present invention to provide an improved radio transmitter for the purpose set forth in which this inconvenience is avoided.

A more specific object is to provide means in such a transmitter for allowing a user to talk into the microphone from a distance, thus without lifting the handset off its hook.

My invention is based upon the realization that sound waves reaching the microphone from a more distant location require a higher degree of amplification on their way to a transmission stage than do sound waves generated in the immediate vicinity of the microphone. On the other hand, a gain substantially exceeding that needed for proper amplification of the generated audio currents would objectionably overdrive the amplifier and associated circuitry so that a mere increase in the gain of the amplifier and/or in the sensitivity of the following transmitting stage will not solve the problem.

In accordance with this invention I provide a second switch, independent of the aforementioned press-to-talk button or other transmit-receive switch, which is operable to connect the microphone to the transmitting stage with concurrent increase in the effective gain of the transmitter amplifier in comparison with the magnitude which that gain has upon operation of the transmit-receive switch.

This change in the relative magnitude of amplifier gain may be accomplished in various ways. Thus, a control circuit responsive to operation of either of the two mutually independent switches may either increase the gain in the normal position of the microphone or decrease the gain when the press-to-talk button is operated. A second amplifier stage may be inserted for high-gain operation and may be shorted out for low-gain operation; it is also possible to employ two separate amplifier stages of different gains for the two modes of operation.

The second switch, adapting the system for talking from a distance, may be designed as a one-touch pushbutton which first trips and then restores an electromagnetic or electronic relay of the self-holding type; alternatively, a nonlocking relay may be provided with a retarding circuit for delaying its release for a predetermined period after the switch has been operated.

In a broader sense, the effective amplifier gain may be modified by a voltage step-up or stepdown in the input circuit of the amplifier, e.g. as realized by the selective short circuiting of certain resistances of an impedance network. Alternatively, or in addition, such an adjustable impedance network could also be included in the output circuit of the amplifier.

In accordance with a further feature of my invention, an additional microphone may be fixedly positioned in the vicinity of the operator to reinforce the sound waves generated by the remote-talking mode of use.

The invention will be described in greater detail with reference to the accompanying in which.

Figure 1:
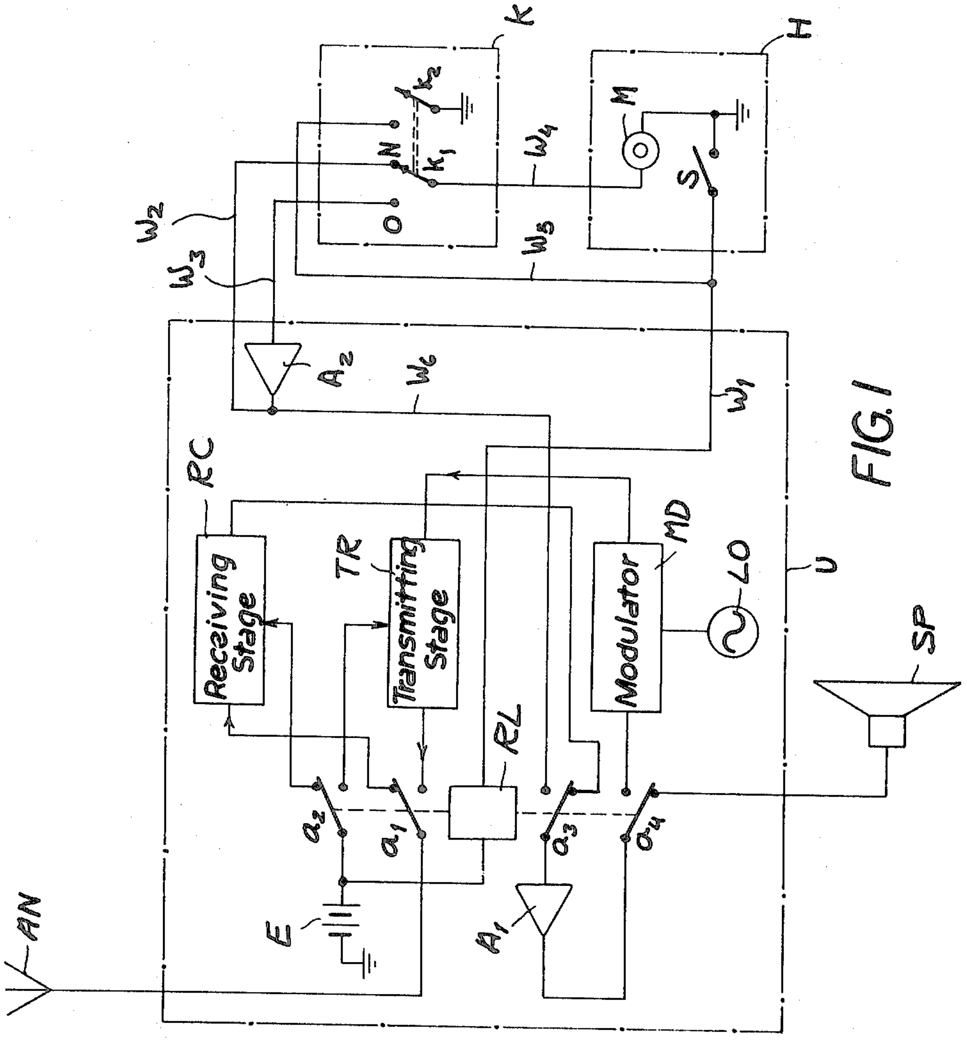
FIG. 1 is an overall circuit diagram of a radio transmitter embodying the present improvement.

The system shown in FIG. 1 comprises a main unit U designed for the most part as a conventional transceiver for two-way radio communication. This unit includes a transmitting stage TR and a receiving stage RC which are alternately connectable to a common antenna AN by way of a switchover relay RL having four armatures $a_1 - a_4$. The winding of relay RL is energizable from a source of direct current, here shown as a battery E, upon closure of a normally open transmit-receive switch S in a handset H which is physically detachable from unit U to which it is conductively connected by a wire $w_1$. A second switch K, provided with two armatures $k_1$, $k_2$, has a normal position N and an off-normal position O. Switch K may be mounted in the immediate vicinity of the operator, e.g. on the steering wheel of an automotive vehicle in which the system is installed. Handset H also includes a microphone M which may be brought close to the mouth of the operator upon detachment of the handset from unit U. A loudspeaker SP is fixedly positioned on unit U to broadcast incoming messages.

In the illustrated unoperated position of relay RL, armature $a_1$ connects antenna AN to the input of receiving stage RC whose output is applied via armature $a_3$ to a first amplifier $A_1$ working by way of armature $a_4$ into speaker SP. Armature $a_2$ activates the receiving stage RC to the exclusion of transmitting stage TR. A second amplifier $A_2$ is open-circuited at this time.

Conventional operation of switch S energizes the relay RL whereupon its armature $a_1$ connects the output of transmitting stage TR to antenna AN, this stage being simultaneously activated by armature $a_2$. The output of microphone M is transmitted via armature $k_1$ of switch K and a wire $w_2$ as well as relay armature $a_3$ to the input of amplifier $A_1$ whose output is concurrently fed by way of relay armature $a_4$ to a modulator MD supplying the transmitting stage TR; the modulator is energized by a local oscillator LO which may also be connected to a demodulator (not shown) associated with the receiving stage RC. The simple circuitry alternately connecting amplifier $A_1$ to stages RC and TR may be modified to include a hybrid-coil transformer, e.g. as shown in my aforementioned copending application Ser. No. 582,811 and U.S. Pat. No. 3,513,397.

With only stage $A_1$ of two-stage amplifier $A_1$, $A_2$ connected in circuit, the gain of that amplifier is relatively low.

If, however, the user reverses the remote-talking switch K instead of the transmit-receive switch S, armature $k_1$ connects the output lead $w_4$ of microphone M to the input of amplifier $A_2$ by way of a wire $w_3$ while armature $k_2$ grounds the wire $w_1$ *through a wire* $w_5$ to complete the operating circuit of relay RL. The two amplifier stages $A_1$, $A_2$ are now connected in cascade so that the overall amplifier gain is relatively high. The output lead of amplifier $A_2$ has been represented by a wire $w_6$.

In this and the following embodiments, the gain-control circuit represented by leads $w_2$, $w_3$ does not affect the amplifier $A_1$ but varies only the gain of amplifier $A_2$, reducing that gain to the value of unity in the limiting case just described.

Figure 2:
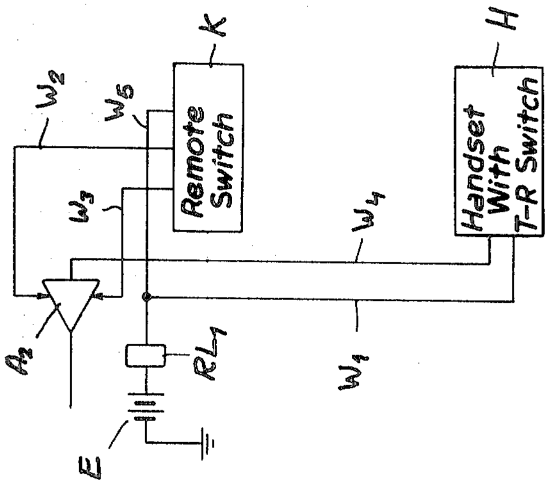
FIGS. 2–4 are block diagrams illustrating various modifications.

In FIG. 2 I have shown a partial modification of the system of FIG. 1 in which the output lead $w_4$ of handset H is directly connected to the input of amplifier $A_2$ whose gain is variable, depending upon which of its control leads $w_2$, $w_3$ is energized. Operation of switch K increases the gain of this amplifier.

Figure 3:
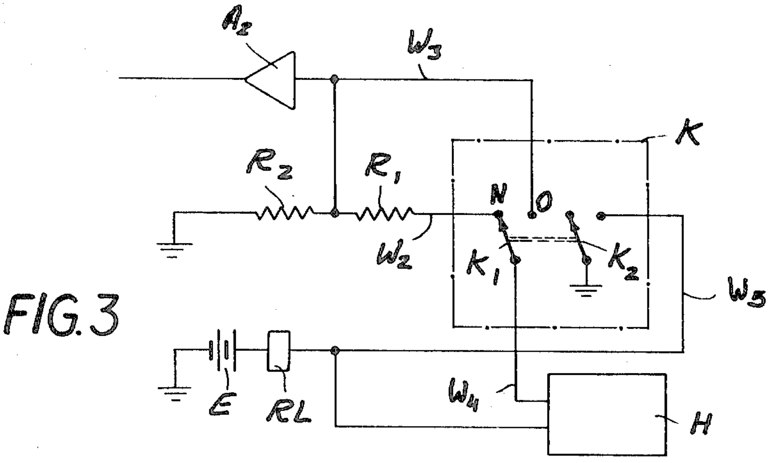

FIG. 3 illustrates a specific way of altering the gain of amplifier $A_2$. In this view the normally disconnected output lead $w_3$ of switch K leads directly into the amplifier input whereas the output lead $w_4$ of handset H terminates, as in FIG. 1, at armature $k_1$ whose normal bank contact N is connected to ground through a voltage divider $R_1$. $R_2$ having a tap tied to lead $w_3$. Thus, operation of the transmit-receive switch S (FIG. 1) in handset H applies only a fraction of the microphone output to amplifier $A_2$ whereas operation of switch K feeds the entire microphone output to that amplifier.

Figure 4:
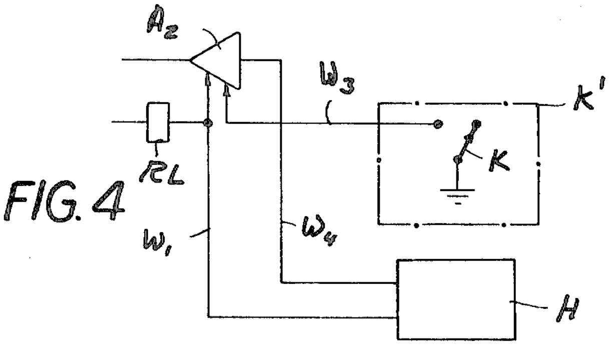

In FIG. 4 I have shown a modified remote-talking switch K' with a single armature $k$ grounding the lead $w_3$ when this switch is operated. Lead $w_3$ again controls the gain of amplifier $A_2$, an alternate control being provided by way of wire $w_1$ when the handset is used to energize the relay RL. As before, operation of the remote-talking switch results in a higher amplifier gain than depression of press-to-talk button S in handset H.

Figure 5:
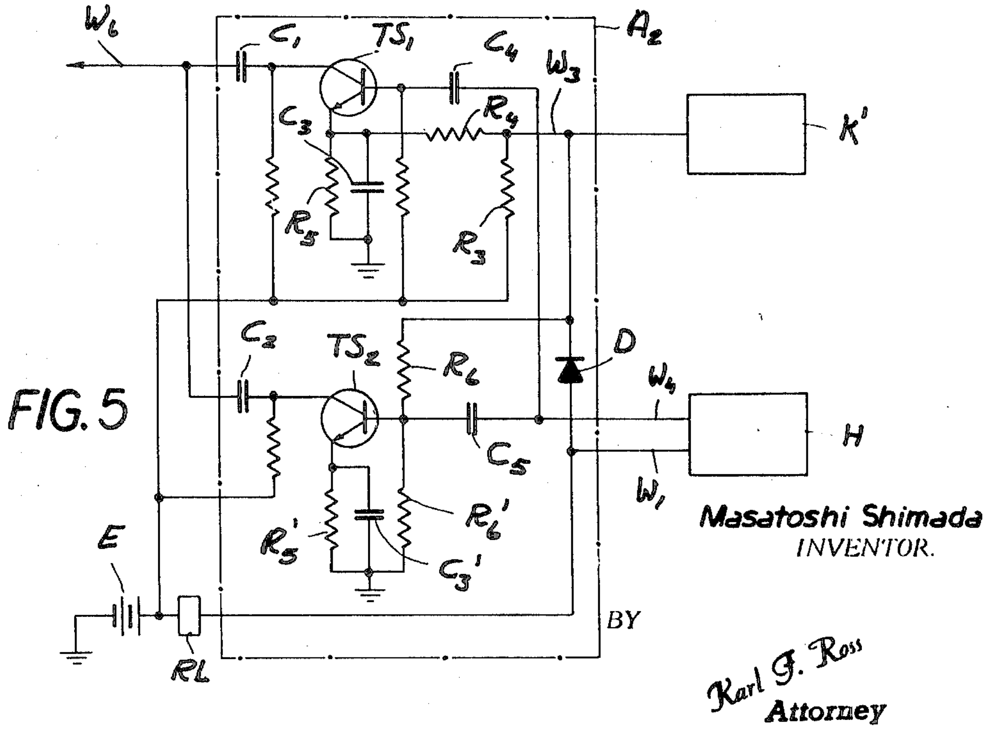
FIG. 5 is a more detailed circuit diagram of the system of FIG. 4.

In FIG. 5 I have shown details of the variable-gain amplifier $A_2$ employed in the system of FIG. 4. This amplifier comprises two NPN transistors $TS_1$, $TS_2$ whose collectors are connected in parallel, through respective coupling condensers $C_1$, $C_2$, to the output lead $w_6$. A voltage divider $R_3$, $R_4$ is connected between the positive terminal of battery E and the emitter of transistor $TS_1$ which is grounded through an integrating network including a resistor $R_5$ and a condenser $C_3$. The junction of resistors $R_3$ and $R_4$ is tied to output lead $w_3$ of switch K', this lead being also connected to ground through a further voltage divider $R_6$, $R_6'$ whose junction is connected to the base of the transistor $TS_2$. Lead $w_4$ is connected in parallel, by way of respective coupling condensers $C_4$, $C_5$, to the bases of transistor $TS_1$, $TS_2$ whereas lead $w_1$ is connected to lead $w_3$ through a diode D.

In the normal operation of the system, i.e. upon closure of the switch of handset H, relay RL is operated and the alternating voltage on output lead $w_4$ of the handset microphone is impressed upon the bases of both transistors. With switch K' unoperated, however, the output of transistor $TS_1$ is cut off or severely reduced by the application of positive potential from battery E to its emitter via resistors $R_3$, $R_4$. A fraction of this positive potential biases the base of transistor $TS_2$, being applied thereto by voltage divider $R_6$, $R_6'$; with the emitter of transistor $TS_2$ grounded through an integrating circuit $R_5'$, $C_3'$, the latter transistor is fully turned on.

The operation of switch K', which grounds the wire $w_3$, substantially cuts off the transistor $TS_2$ and unblocks the transistor $TS_1$ whose gain is higher than that of transistor $TS_2$. Relay RL is energized by way of diode D.

Figure 6:
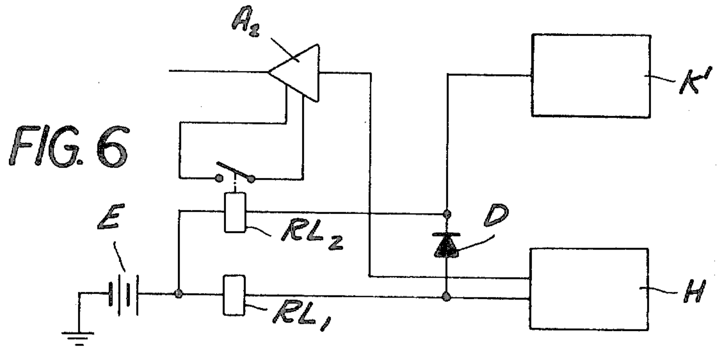
FIGS. 6–13 are further block diagrams illustrating additional modifications.

The change in amplifier gain upon operation of switch K' need not be effected directly but may be achieved through another relay, as illustrated in FIG. 6. In that Figure, the relay controlling the switchover from reception to transmission has been designated $RL_1$ and is connected in parallel with another relay $RL_2$, except for the interposition of diode D in series with the winding of relay $RL_1$. Owing to the presence of this diode, relay $RL_2$ does not operate when the switch S (FIG. 1) of handset H is closed; it responds, however, to closure of switch K' and thereupon completes a control circuit for amplifier $A_2$ to increase its gain in any of the ways previously described.

Figure 7:
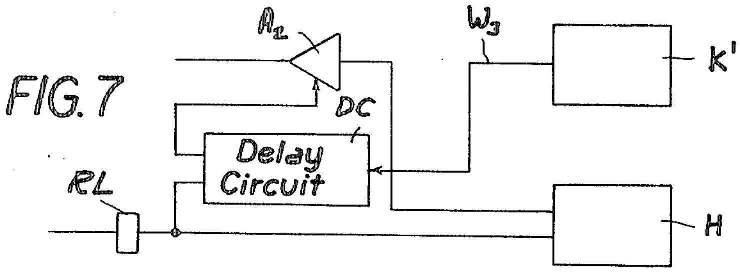

According to FIG. 7, the gain of amplifier $A_2$ is controlled by a delay circuit DC which, upon the grounding of wire $w_3$ by switch K', stores a signal maintaining the altered condition of amplifier $A_2$ for a predetermined period. Delay circuit DC may include an integrating network, a monostable multivibrator, a slow releasing relay of any equivalent circuit means. Thus, the user need not continuously depress the switch K' but may release it for short periods without interrupting his transmission.

Figure 8:
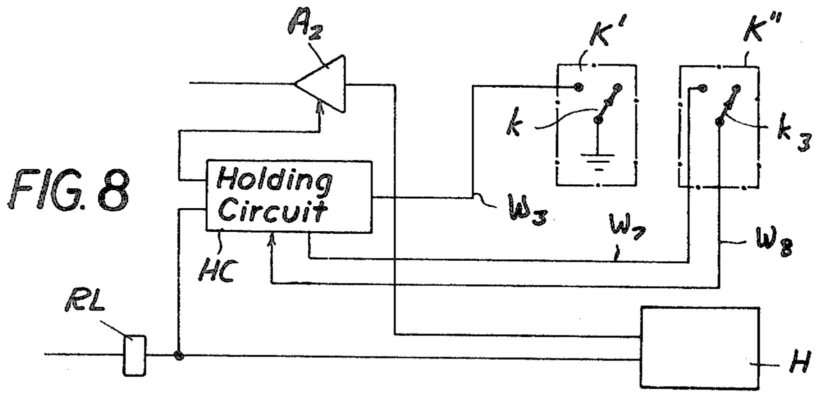

The system of FIG. 8 has two separate pushbuttons K', K'', with respective armatures $k$ and $k_3$, for alternately tripping and restoring a holding circuit HC to vary the gain of amplifier $A_2$. Holding circuit HC may include, for example, a flip-flop connected to be set by the grounding of wire $w_3$ (upon momentary closure of switch K') and to be reset by the interconnection of two further wires $w_7$, $w_8$ (upon momentary closure of switch K''). In both FIGS. 7 and 8, relay RL is energized concurrently with the increase of the gain of amplifier $A_2$ through circuit DC or HC.

Figure 9:
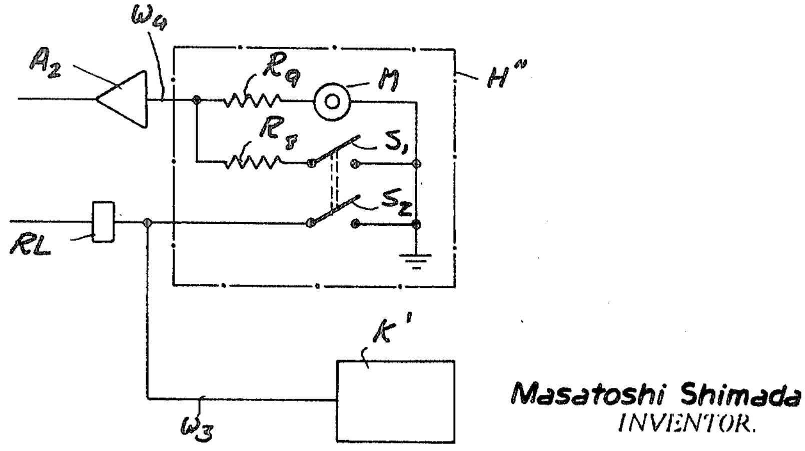

In FIG. 9 I have shown a modified handset H'' in which the switch S of the preceding embodiments is replaced by a compound switch having two armatures $S_1$, $S_2$. Closure of switch contact $S_1$ grounds the input lead $w_4$ of amplifier $A_2$ through a resistor $R_8$ which complements a resistor $R_9$ in the output of microphone M to form therewith a voltage divider reducing the amplitude of the generated audio oscillations. The simultaneous closure of switch contact $S_2$ energizes the relay RL. Closure of switch K', on the other hand, energizes this relay without reducing the microphone output so that the effective gain of amplifier $A_2$ is increased.

Figure 10:
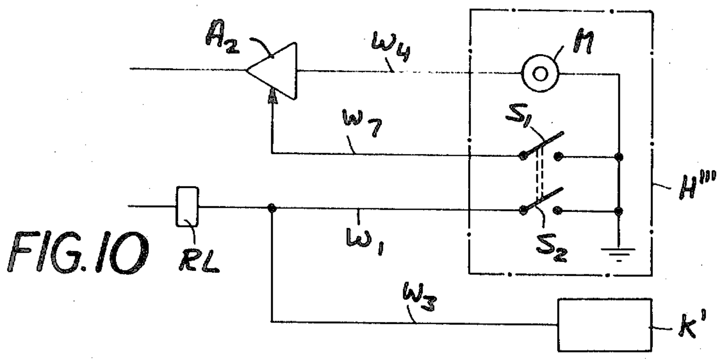

As shown in FIG. 10, another modified handset H''' includes the compound switch $S_1$, $S_2$ of FIG. 9 without the resistances $R_8$, $R_9$. In this case the gain of amplifier $A_2$ is lowered by the grounding of a wire $w_7$ through closure of contact $S_1$ when the system is used in the conventional way, i.e. with depression of the transmit-receive switch of handset H'''. When the relay RL is alternatively energized through operation of switch K', the amplifier has its normal high gain.

Figure 11:
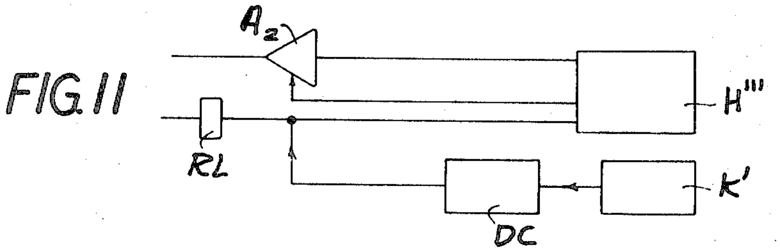

FIG. 11 shows a combination of features illustrated in FIGS. 7 and 10, i.e. the control of the amplifier gain by a multicontact switch in a handset H''' and the maintenance of the energization of relay RL, upon closure of switch K', through a delay circuit DC.

Figure 12:
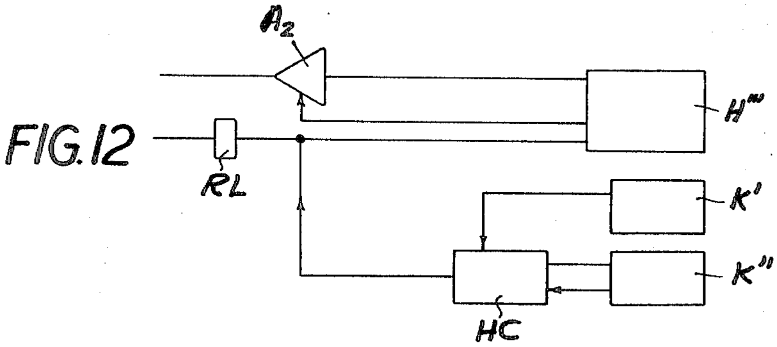

Similarly, FIG. 12 illustrated a combination of features from FIGS. 8 and 10, a holding circuit HC of the aforedescribed type being alternately settable and resettable by a pair of pushbutton switches K', K''.

Figure 13:
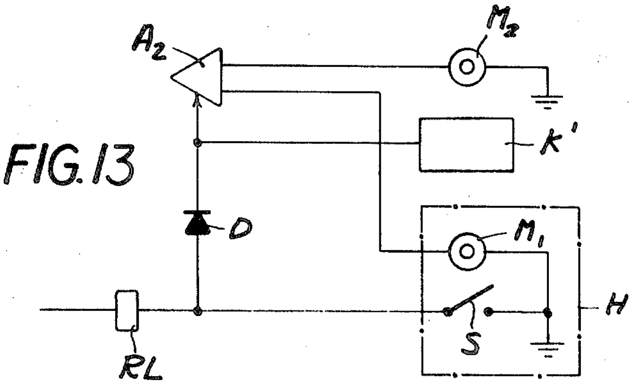

In FIG. 13, finally, I have shown a system generally similar to that of FIG. 5 in which a first microphone $M_1$, forming part of the handset H, has been supplemented by a second microphone $M_2$, fixedly positioned at a convenient location outside the main unit U (FIG. 1). Although microphone $M_2$ is shown permanently connected to an input of amplifier $A_2$, its contribution to the signal volume of that amplifier will be insignificant during closure of switch S when the microphone $M_1$ is close to the mouth of the user and the gain of the amplifier is low. In its high-gain condition, however, amplifier $A_2$ effectively combines the outputs of both microphones which are then on the same order of magnitude. Naturally, a circuit breaker (not shown) could be interposed between amplifier $A_2$ and microphone $M_2$ for cutting off that microphone, under the control of switch K' or S (or of a hook switch actuated by the removal of the handset H from the main unit), during conventional use of microphone $M_1$.

I claim:

1. In a radio transmitter, in combination:

a main unit including transmitting means for outgoing messages;

an ancillary unit detachable from said main unit but conductively connected therewith;

a microphone on said ancillary unit;

amplifier means connectable between said microphone and said transmitting means;

first switch means on said ancillary unit operable to connect said microphone to said transmitting means via at least a part of said amplifier means;

second switch means independent of said first switch means operable to connect said microphone to said transmitting means by way of at least a part of said amplifier means;

and control means responsive to at least one of said switch means for relatively increasing the effective gain of said amplifier means upon operation of said second switch means whereby such operation enables use of said microphone from a more remote location.

2. The combination defined in claim 1 wherein said amplifier means is provided with an input circuit and an output circuit, at least one of said circuits including impedance means replaceable by said control means with a short circuit for varying said effective gain.

3. The combination defined in claim 1 wherein said amplifier means comprises a plurality of stages in cascade, said control means being operative to short circuit one of said stages in the unoperated condition of said second switch means.

4. The combination defined in claim 1 wherein said amplifier means comprises a low-gain stage and a high-gain stage connected in parallel, said control means substantially inhibiting said high-gain stage in the unoperated condition of said second switch means and substantially inhibiting said low-gain stage in the operated condition of said second switch means.

5. The combination defined in claim 1 wherein said main unit includes receiving means for incoming messages, common antenna means for said transmitting and receiving means, and switchover means independently controlled by said first and second switch means for alternately activating said transmitting means and said receiving means, said receiving means being activated in the unoperated condition of both said first and second switch means.

6. The combination defined in claim 5 wherein said amplifier means includes a first amplifier with a gain independent of said control means common to said transmitting and receiving means and a second amplifier connectable in cascade with said first amplifier by said switchover means upon operation of either one of said first and second switch means.

7. The combination defined in claim 5 wherein said control means includes a delay circuit responsive to operation of said second switch means for maintaining said switchover means effective to activate said transmitting means for a predetermined period following restoration of said second switch means to an unoperated condition.

8. The combination defined in claim 5 wherein said control means includes a holding circuit responsive to a first actuation of said second switch means for operating said switchover means and for restoring said switchover means to normal in response to a second actuation of said second switch means.

9. The combination defined in claim 8 wherein said second switch means comprises a pair of contacts momentarily closable for respectively enabling and disabling said holding circuit.

10. The combination defined in claim 1, further comprising a fixedly positioned second microphone connected to an input of said amplifier means in parallel with the microphone on said auxiliary unit.